US009817565B2

(12) United States Patent
Idzik et al.

(10) Patent No.: US 9,817,565 B2
(45) Date of Patent: Nov. 14, 2017

(54) APPARATUS AND METHOD PERTAINING TO THE USE OF A PLURALITY OF 3D GESTURE SENSORS TO DETECT 3D GESTURES

(71) Applicant: BlackBerry Limited, Waterloo (CA)

(72) Inventors: Jacek S. Idzik, Kenilworth (CA); Peter Mankowski, Waterloo (CA); Cornel Mercea, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 114 days.

(21) Appl. No.: 13/948,283

(22) Filed: Jul. 23, 2013

(65) Prior Publication Data

US 2015/0029085 A1    Jan. 29, 2015

(51) Int. Cl.
*G09G 5/00* (2006.01)
*G06F 3/0487* (2013.01)
*G06F 3/01* (2006.01)

(52) U.S. Cl.
CPC ............ *G06F 3/0487* (2013.01); *G06F 3/017* (2013.01)

(58) Field of Classification Search
CPC ...... G06F 3/0487; G06F 3/041; G06F 3/0412; G06F 3/0414; G06F 3/0416; G06F 3/0418; G06F 3/042; G06F 3/0421; G06F 3/0423; G06F 3/0425; G06F 3/0426; G06F 3/0428; G06F 3/043; G06F 3/0433; G06F 3/0436; G06F 3/044; G06F 3/045; G06F 3/0467; G06F 3/00
USPC ................................... 345/156–174; 715/863
See application file for complete search history.

(56) References Cited

U.S. PATENT DOCUMENTS

| 7,330,035 | B2 | 2/2008 | Van Berkel |
| 8,223,589 | B2 | 7/2012 | Liu |
| 8,305,843 | B2 | 11/2012 | Dahl et al. |
| 2008/0120447 | A1 | 5/2008 | Ku et al. |
| 2010/0063813 | A1 | 3/2010 | Richter et al. |
| 2011/0115784 | A1* | 5/2011 | Tartz ..................... G06F 1/1624 345/419 |
| 2011/0310005 | A1 | 12/2011 | Chen et al. |

(Continued)

FOREIGN PATENT DOCUMENTS

| EP | 2535787 A2 | 12/2012 |
| WO | 2012/006189 A2 | 1/2012 |

OTHER PUBLICATIONS

Extended European Search Report from related European Patent Application No. 13177671.8 dated Nov. 7, 2013; 6 pages.

(Continued)

*Primary Examiner* — Insa Sadio
(74) *Attorney, Agent, or Firm* — Jon Gibbons; Fleit Gibbons Gutman Bongini & Bianco P.L.

(57) ABSTRACT

A device having at least two 3-dimensional gesture sensors that employ differing gesture-sensing modalities as compared to one another further includes a control circuit that operably couples to both of these 3-dimensional gesture sensors and employs both to detect three-dimensional gestures. By one approach the control circuit employs both sensors in a temporally-overlapping manner to reliably and accurately detect the 3D gesture. As another illustrative example, the control circuit may employ different sensors during different portions of a given 3D gesture to detect those corresponding portions of the 3D gesture.

20 Claims, 3 Drawing Sheets

(56) References Cited

U.S. PATENT DOCUMENTS

2012/0200497 A1* 8/2012 Nasiri et al. ................. 345/157
2012/0274550 A1* 11/2012 Campbell ........... G06F 3/04883
　　　　　　　　　　　　　　　　　　　　　　　345/156
2012/0280900 A1* 11/2012 Wang .................... G06F 3/0488
　　　　　　　　　　　　　　　　　　　　　　　345/156
2012/0280905 A1　11/2012 Vonog et al.

OTHER PUBLICATIONS

European Examination Report dated Jan. 20, 2017, received for European Application No. 13177671.8.

* cited by examiner

APPARATUS AND METHOD PERTAINING TO THE USE OF A PLURALITY OF 3D GESTURE SENSORS TO DETECT 3D GESTURES

FIELD OF TECHNOLOGY

The present disclosure relates to electronic devices, including but not limited to portable electronic devices having 3D gesture detection capabilities.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as so-called smartphones, wireless personal digital assistants (PDAs), and laptop and pad/tablet-styled computers with wireless capabilities.

Many such devices permit the user to interact with the device using gestures. A gesture typically comprises a particular type of touch on a touch-sensitive display, and may begin at an origin point and continue to an end point. A particular gesture may be identified (from amongst a plurality of possible gestures) by attributes of the gesture including, for example, the origin point, end point, distance travelled, duration, velocity, and direction of the gesture. Such gestures can be considered two-dimensional gestures because the complete gesture occurs on the two-dimensional plane of a touch-sensitive display.

Some devices, in combination with two-dimensional gestures or in lieu thereof, are configured to permit the user to interact with the device via three-dimensional (3D) gestures. A gesture becomes a "3D" gesture when part or all of the gesture involves a path and/or event that is removed from the two-dimensional plane of the touch-sensitive display. As an illustrative example, a 3D gesture might comprise the user's pointing finger moving from the left side of the device laterally across the device to the right anywhere from 10 millimeters or so above the device to a few centimeters.

There are various known ways to detect a 3D gesture. Unfortunately, these known approaches each have their strengths and weaknesses. Some approaches, for example, are highly reliable with respect to accurately detecting and distinguishing between different 3D gestures, but consume a great deal of power and/or computational capacity. One approach may be particularly good at discerning gesture shapes, while yet another approach is particularly adept at detecting general relative motion, albeit with limited resolution and definition as regards shape and form.

As a result, 3D-gesture designers often find their gesture designs highly limited by the sensor choices that characterize a given product, while hardware designers may find their design requirements driven by specific 3D gestures that the final product must support.

DETAILED DESCRIPTION

Figure 1:
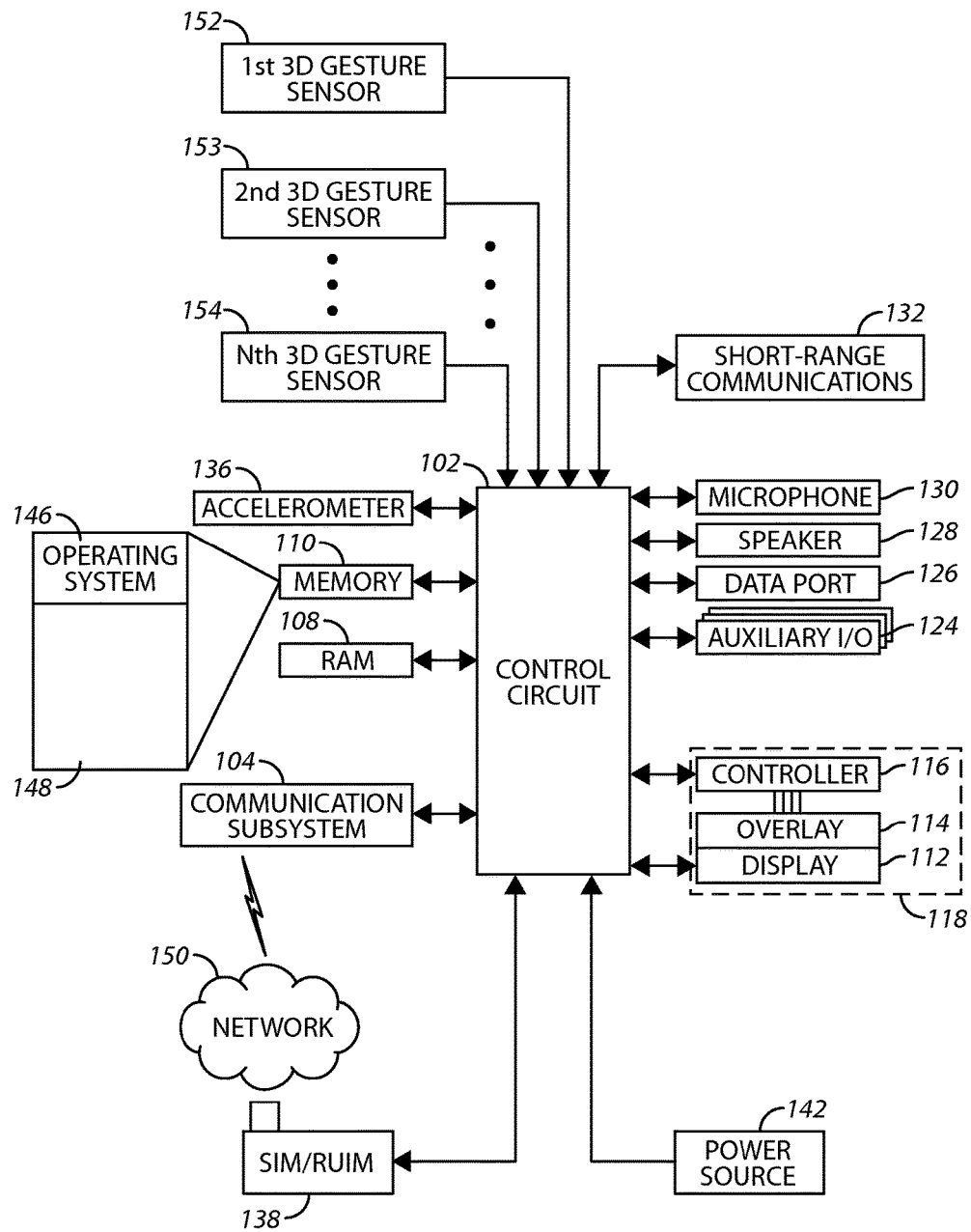
FIG. 1 is a block diagram in accordance with the disclosure.

The following describes an apparatus and method pertaining to a device having at least two 3D gesture sensors that employ differing gesture-sensing modalities as compared to one another. A control circuit operably couples to both of these 3D gesture sensors and employs both to detect three-dimensional gestures.

These teachings are highly flexible in practice and will accommodate considerable variety with respect to specific implementations. By one approach, for example, the control circuit employs both 3D gesture sensors in a temporally-overlapping manner to reliably and accurately detect the 3D gesture. In this case, for example, the detection weaknesses of one gesture-sensing modality can be compensated for by the well-chosen strengths of the other gesture-sensing modality. So configured, a given device may be able to reliably accommodate a wider range of 3D gestures than has previously been considered practical or possible.

As another illustrative example, different 3D gesture sensors may be employed during different portions of a given 3D gesture to detect those corresponding portions of the 3D gesture. Using this approach may utilize less power and/or computational capacity than employing both (or all) 3D gesture sensors in a temporally overlapping manner while nevertheless achieving acceptable accuracy by using the right 3D gesture sensor for given portions of the 3D gesture.

And as yet another illustrative example, a plurality of differing 3D gesture sensors may be initially employed when detecting a given 3D gesture, but the control circuit may selectively switch to using some lesser subset (including only one of the available 3D gesture sensors) to complete the detection of the full 3D gesture. Using this approach can again enable the control circuit to make intelligent choices about which 3D gesture sensors to use when detecting a 3D gesture at a time of need.

These teachings are highly scalable and will accommodate, for example, any number and type of 3D gesture sensors and/or 3D gestures.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

By one approach these teachings are readily carried out by an appropriately-configured portable electronic device of choice. As an illustrative example in such regards, FIG. 1 presents a portable electronic device. This description of these teachings will presume the use of such a device for the sake of an illustrative example. It will be understood, however, that no limitations are intended by way of the specificity of this example.

This portable electronic device includes a control circuit 102 that controls the overall operation of the portable electronic device. In this particular illustrative example the portable electronic device comprises a portable communications device. Corresponding communication functions, including data and voice communications, are performed through a communication subsystem 104. The communication subsystem receives messages from and sends messages to a wireless network 150.

The wireless network 150 may be any type of wireless network, including, but not limited to, a wireless data networks, a wireless voice network, or a network that supports both voice and data communications. The control circuit 102 may also operably couple to a short-range communication subsystem 132 (such as an 802.11 or 802.16—compatible transceiver and/or a Bluetooth™-compatible transceiver). To identify a subscriber for network access, the portable electronic device may utilize a Subscriber Identity Module or a Removable User Identity Module (SIM/RUIM) card 138 for communication with a network, such as the wireless network 150. Alternatively, user identification information may be programmed into a memory 110.

The control circuit 102 may interact with an accelerometer 136 that may be utilized to detect direction of gravitational forces or gravity-induced reaction forces. The control circuit 102 also interacts with a variety of other components, such as a Random Access Memory (RAM) 108, an auxiliary input/output (I/O) subsystem 124, a data port 126, a speaker 128, a microphone 130, and other device subsystems of choice. A power source 142, such as one or more rechargeable batteries or a port to an external power supply, powers the electronic device.

A display 112 can be disposed in conjunction with a touch-sensitive overlay 114 that operably couples to an electronic controller 116. Together these components can comprise a touch-sensitive display 118 that serves as a graphical-user interface. Information, such as text, characters, symbols, images, icons, and other items may be displayed on the touch-sensitive display 118 via the control circuit 102.

The portable electronic device includes an operating system 146 and software programs, applications, or components 148 that are executed by the control circuit 102 and are typically stored in a persistent, updatable store such as the memory 110. Additional applications or programs may be loaded onto the portable electronic device through the wireless network 150, the auxiliary I/O subsystem 124, the data port 126, the short-range communications subsystem 132, or any other suitable subsystem 134.

The memory 110 may comprise a non-transitory storage media that stores executable instructions which, when executed, causes one or more of the functions, steps, or actions described herein. (As used herein, this reference to "non-transitory" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

This portable electronic device also includes a plurality of 3D gesture sensors including at least a first 3D gesture sensor 152 and a second 3D gesture sensor 153. These teachings will optionally accommodate essentially any additional number of 3D gesture sensors (represented here by an $N^{th}$ 3D gesture sensor 154 where "N" is an integer greater than "2"). All of these 3D gesture sensors 152-154 operably couple to the aforementioned control circuit 102 such that the latter can receive data from the former. These teachings will also accommodate having the control circuit 102 control, in any of a variety of ways, the operability and operating state of any one or more of the 3D gesture sensors.

At least the first and second 3D gesture sensors 152 and 153 differ from one another as regards their gesture-sensing modalities. Any additional 3D gesture sensors 154, when provided, can employ a gesture-sensing modality that is similar or identical to that of either or both of the first and second 3D gesture sensors 152 and 153 or, if desired, different yet again.

These teachings will accommodate a wide variety of differing gesture-sensing modalities. Examples include, but are not limited to, camera-based modalities, capacitive-based modalities, infrared light-based modalities, ambient light-based modalities, and ultrasonic-based modalities as desired. 3D gesture sensors that use such modalities of sensing a 3D gesture are known in the art. As the present teachings are not overly sensitive to any particular selections in these regards, for the sake of brevity further detail in these regards is not presented here.

Being 3D gesture sensors, the control circuit 102 can employ any of these 3D gesture sensors to detect a user's given 3D gesture. By one approach, however, the present teachings provide for using the first and second 3D gesture sensors 152 and 153 in a temporally contemporaneous manner to detect the same 3D gesture. This could comprise, for example, using both a camera-based sensor and a capacitive-based sensor to detect a particular 3D gesture.

By one approach the control circuit 102 can simply process the detection results from each 3D gesture sensor in a discrete fashion and then, for example, average the results (or combine the detection results in some other manner of choice) to provide a final detection result. When a given device uses any of three possible 3D gestures, for example, this approach can provide for determining with a first 3D gesture sensor which 3D gesture the user has applied and also using the second 3D gesture sensor 153 to separately come to a second corresponding conclusion. Those results can then be compared to one another or otherwise merged to come to a particular final conclusion.

In many cases the control circuit 102 will have some sense of likelihood as regards the conclusion reached using any given set of data. For example, the control circuit 102 may know that the first 3D gesture sensor 152 has detected a first 3D gesture with a 65% likelihood of being correct and that the second 3D gesture sensor 153 has detected a second, different 3D gesture with an 80% likelihood of being correct. In this case, the control circuit 102 can choose to accept the results of the second 3D gesture sensor 153 and to effectively ignore the results of the first 3D gesture sensor 152.

These teachings will also accommodate fusing the results from the utilized 3D gesture sensors. For example, movement data may be more reliable from the first 3D gesture sensor 152 while shape data may be more reliable from the second 3D gesture sensor 153. In such a case, the sensor data from both sensors 152 and 153 can be merged to provide the control circuit 102 with reliable information regarding both movement of the gesture and the shape(s) of the gesture to thereby better facilitate accurate detection of the user's 3D gesture.

Figure 2:
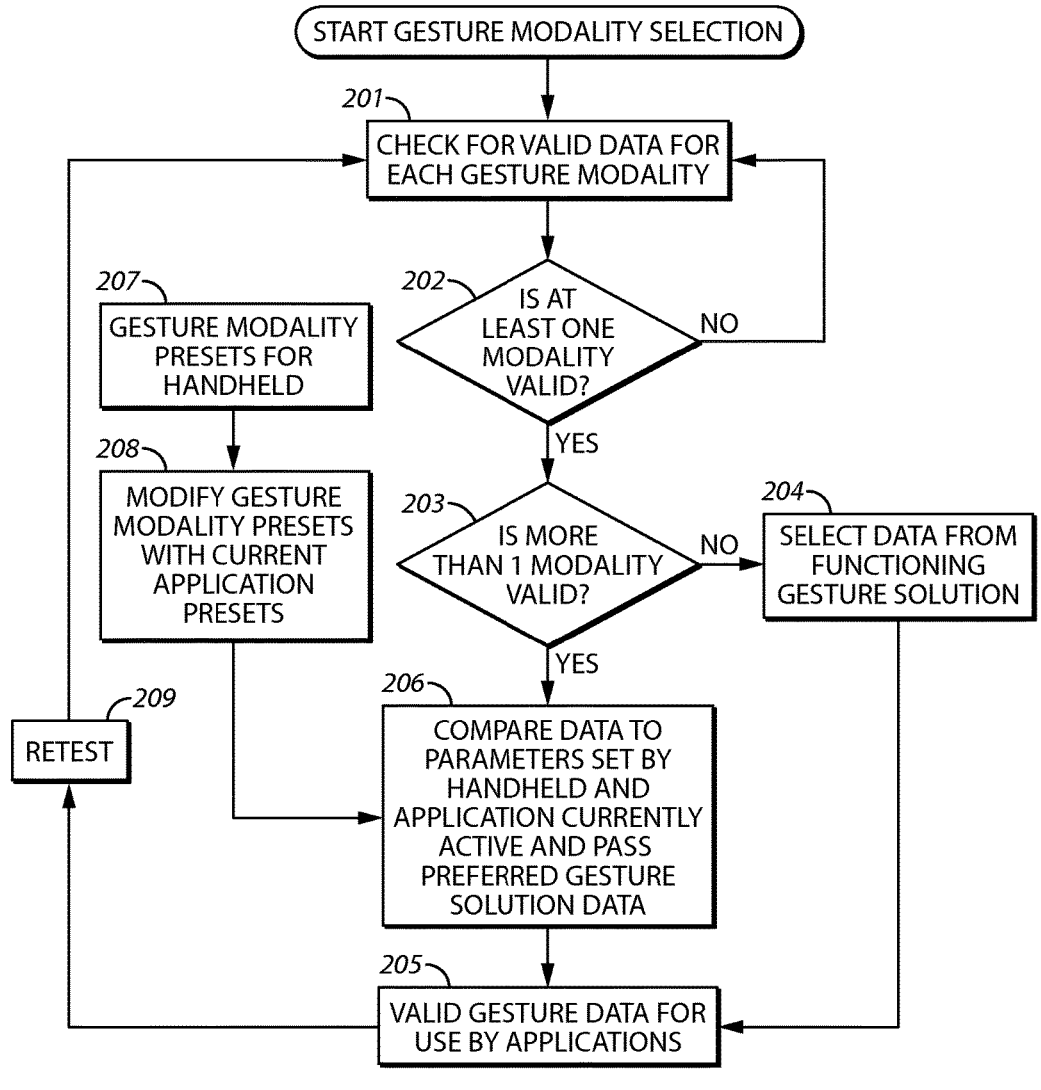
FIG. 2 is a flow diagram in accordance with the disclosure.

FIG. 2 presents a more particular example in the foregoing regards. This process 200 provides, at block 201, for checking for valid data using each available 3D gesture sensor modality. (If desired, this check can be selectively limited to only a particular subset of available modalities. Such a subset may be determined, for example, on an application-by-application basis.) This check can be conducted on as regular and periodic a basis (or as irregularly and/or non-periodically) as may suit the particular needs and characteristics of a particular application setting.

At block 202 the process 200 provides for determining whether at least one of the checked modalities provides valid content/data. When such is not the case the process 200 can provide for repeating the foregoing activity until valid content/data becomes available for at least one of the checked 3D gesture-sensing modalities.

When at least one of the 3D gesture-sensing modalities does provide valid content/data, at block 203 the process 200 provides for determining whether more than one of the checked modalities currently provides such content/data. When only one modality serves in these regards, at block 204 the process 200 provides for selecting the content/data for the 3D gesture solution from that particular 3D gesture-sensing modality. At block 205 the process 200 makes that valid gesture content/data available for use by the appropriate and corresponding application or applications.

When the foregoing actions reveals that more than one of the available 3D gesture-sensing modalities provides valid content/data, at block 206 this process 200 provides for comparing the respective content/data from those functioning modalities to parameters set by the corresponding device (in this case, the device is presumed to be a handheld device such as a smartphone or a smaller tablet or pad-styled device) and by the corresponding presently-active application(s) to identify and pass a particular result that will serve as a preferred 3D gesture solution.

By one approach, for example, the device may have one or more gesture modality presets as denoted in block 207, which presets can then be modified at block 208 in view of one or more current-application presets. Such modifications can comprise, for example, substituting a device preset for an application preset or modifying (without substituting) the device preset in view of one or more of the application presets. So configured, a selection can be made amongst various 3D gesture sensors based, at least in part, upon whatever emphasis the implementing device and/or the currently-running application may apply with respect to preferences in those regards. For example, a particular application may rely heavily upon hand shape-based gestures and hence may prefer camera-based or ultrasound-based 3D gesture-detection modalities.

In any event, at block 205 the process 200 again provides for providing the resultant gesture data for use by the corresponding application(s). Retesting (at block 209) can occur as desired. In some cases, a particular selected 3D gesture-sensing modality, once selected for a particular gesture or string of sequential gestures, may remain selected without retesting until, for example, some predetermined period of time passes without detecting a 3D gesture. In other cases, retesting may occur more frequently to permit, for example, switching amongst the available 3D gesture sensing modalities even while continuing to detect the full extent and measure of a given gesture.

Figure 3:
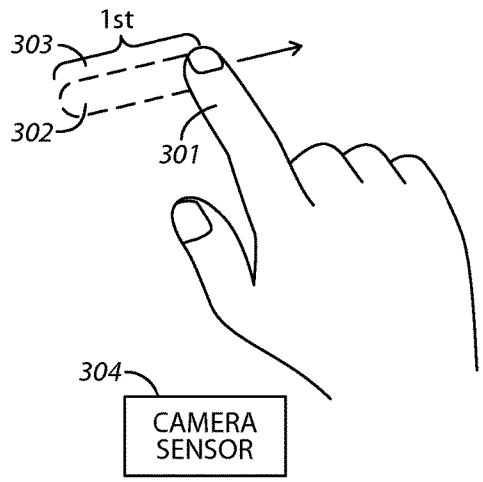
FIG. 3 is a perspective view in accordance with the disclosure.
Figure 4:
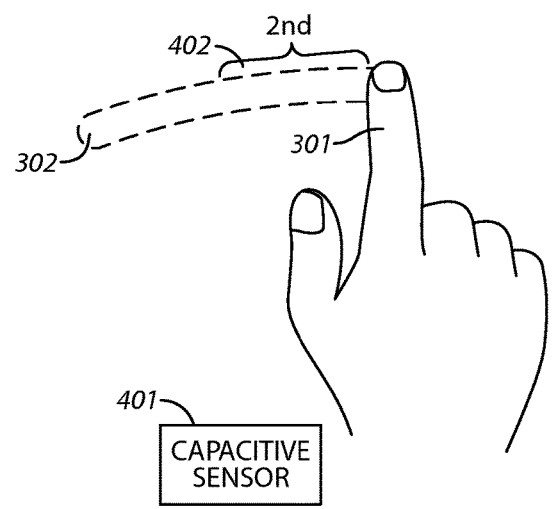
FIG. 4 is a perspective view in accordance with the disclosure.
Figure 5:
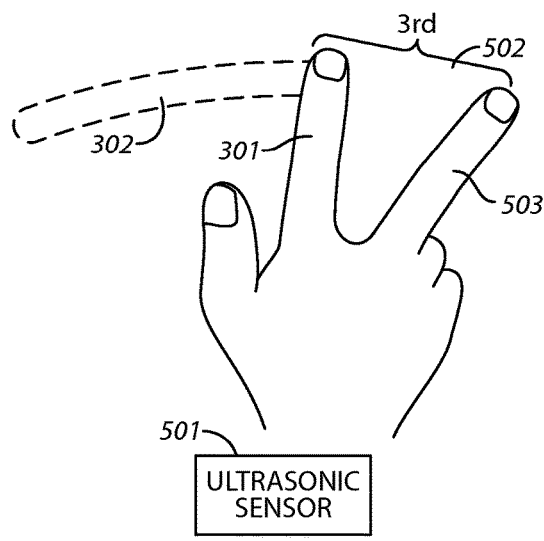
FIG. 5 is a perspective view in accordance with the disclosure.

FIGS. 3-5 provide an illustrative example with respect to the approach of switching amongst 3D gesture sensors even while detecting a single complete gesture. In FIG. 3, the user has begun a particular 3D gesture 302 by moving their extended index finger 301 through the air. In this example a camera sensor 304 serves to detect the first portion 303 of the 3D gesture 302.

In FIG. 4 the control circuit 102 switches from the camera sensor 304 to a capacitive sensor 401 to detect a second portion 402 of the 3D gesture 302. A capacitively-based sensing modality is considerably less accurate than the camera-based modality. In a case, however, where all 3D gestures that have a first portion 303 as shown above are followed by a general continuation of the imaginary line being "drawn" through the air by the user's finger 301, continued use of the camera sensor 304 is unnecessary as the less-capable capacitive sensor 401 is nevertheless capable enough to detect that second portion 402. By switching from the camera sensor 304, of course, the control circuit 102 can also remove power from that component and hence realize a potentially significant savings in power.

And in FIG. 5 the control circuit 102 switches from the capacitive sensor 401 to an ultrasonic sensor 501 to detect a third portion 502 of the 3D gesture 302. In this case, the 3D gesture 302 concludes with one of a number of possible finger configurations. Here, in this example, the 3D gesture 302 concludes with a "V" sign formed using the user's index finger 301 and middle finger 503. Both the camera sensor 304 and the ultrasonic sensor 501 will serve well to reliably and accurately distinguish amongst shapes in these regards. In this case, however, the ultrasonic sensor 501 consumes less energy than the camera sensor 304 and therefore the control circuit 102 employs the ultrasonic sensor 501 as part of an overall power-conserving strategy while still assuring accurate detection of the user's 3D gestures.

So configured, a control circuit can, for example, test each of a plurality of 3D gesture sensors with respect to a current 3D gesture to identify a best 3D gesture sensor to employ to detect the current 3D gesture. By one approach the foregoing can comprise using each (or at least some) of the plurality of 3D gesture sensors to detect corresponding portions of a current 3D gesture. The control circuit can be further configured to make determinations regarding which 3D gesture sensor is best suited as a function, at least in part, of any one of (or any combination of) sensing accuracy, power consumption, computational intensity, and so forth.

By one approach, the control circuit can make sure determinations (and switch amongst the available 3D gesture sensors) on the fly and even while in the process of detecting a given 3D gesture. Such activity can be based, at least in part, on a priori knowledge regarding, for example, likely or possible remaining portions of a currently-detected 3D gesture.

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An apparatus comprising:
   a processor and memory running an application using one or more gestures as inputs;
   a touch-sensitive display for sensing two-dimensional gestures in a two-dimensional plane;
   a first non-contact three-dimensional gesture sensor for sensing a user's hand movement in front of and relative to the touch-sensitive display;
   at least a second non-contact three-dimensional gesture sensor for sensing the user's hand movement in front of and relative to the touch-sensitive display, the first and second non-contact three-dimensional gesture sensors employing differing gesture-sensing modalities;
   a control circuit operably coupled to the first and second non-contact three-dimensional gesture sensors and configured to switch between the first non-contact three-dimensional gesture sensor and the at least a second non-contact three-dimensional gesture sensor while in the process of detecting a current three-dimensional gesture of the user's hand movement, wherein the switch is based on each of remaining predictable portions of the currently detected three-dimensional gesture, and a combination of sensing accuracy, power consumption and computational intensity.

2. The apparatus of claim 1 wherein the gesture-sensing modalities include at least one gesture-sensing modality selected from a group comprising a camera-based modality, a capacitive-based modality, an infrared light-based modality, an ambient light-based modality, and an ultrasonic-based modality.

3. The apparatus of claim 1 wherein the control circuit is configured to employ both the first and second non-contact three-dimensional gesture sensors to detect a three-dimensional gesture by, at least in part, testing each of the first and second non-contact three-dimensional gesture sensors with respect to a current three-dimensional gesture to identify a best non-contact three-dimensional gesture sensor to employ to detect the current three-dimensional gesture.

4. The apparatus of claim 1 wherein the control circuit is configured to employ both the first and second non-contact three-dimensional gesture sensors to detect a three-dimensional gesture by, at least in part, using each of the first and second non-contact three-dimensional gesture sensors to detect a portion of a current three-dimensional gesture.

5. The apparatus of claim 4 wherein the control circuit is configured to use each of the first and second non-contact three-dimensional gesture sensors to detect a portion of a current three-dimensional gesture by, at least in part, using at least one of the first and second non-contact three-dimensional gesture sensors to detect a portion, but only a portion, of the current three-dimensional gesture.

6. The apparatus of claim 1 wherein the control circuit is configured to employ both the first and second non-contact three-dimensional gesture sensors to detect a three-dimensional gesture by, at least in part, determining which of the first and second non-contact three-dimensional gesture sensors is best suited to detect at least certain portions of a predicted three-dimensional gesture.

7. The apparatus of claim 6 wherein the control circuit is configured to determine which of the first and second non-contact three-dimensional gesture sensors is best suited as a function, at least in part, of both sensing accuracy and power consumption.

8. A method comprising on an electronic device by a control circuit that is operably coupled to a processor and memory running an application using one or more gestures as inputs;

a touch-sensitive display for sensing two-dimensional gestures in a two-dimensional plane;

a first non-contact three-dimensional gesture sensor for sensing a user's hand movement in front of and relative to the touch-sensitive display and at least a second non-contact three-dimensional gesture sensor for sensing the user's hand movement in front of and relative to the touch-sensitive display, the first and second non-contact three-dimensional gesture sensors employing differing gesture-sensing modalities; and switching between, based upon presets in the application, the first non-contact three-dimensional gesture sensor to detect a first portion of a current three-dimensional gesture of the user's hand movement and second non-contact three-dimensional gesture sensor to detect a second portion of the current three-dimensional gesture, wherein the switching is based on each of remaining predictable portions of the currently detected three-dimensional gesture, and a combination of sensing accuracy, power consumption and computational intensity.

9. The method of claim 8 wherein the gesture-sensing modalities include at least one gesture-sensing modality selected from a group comprising a camera-based modality, a capacitive-based modality, an infrared light-based modality, an ambient light-based modality, and an ultrasonic-based modality.

10. The method of claim 8 wherein employing both the first and second non-contact three-dimensional gesture sensors to detect a three-dimensional gesture comprises, at least in part, testing each of the first and second non-contact three-dimensional gesture sensors with respect to a current three-dimensional gesture to identify a best non-contact three-dimensional gesture sensor to employ to detect the current three-dimensional gesture.

11. The method of claim 8 wherein employing both the first and second non-contact three-dimensional gesture sensors to detect a three-dimensional gesture comprises, at least in part, using each of the first and second non-contact three-dimensional gesture sensors to detect a portion of a current three-dimensional gesture.

12. The method of claim 11 wherein using each of the first and second non-contact three-dimensional gesture sensors to detect a portion of a current three-dimensional gesture comprises, at least in part, using at least one of the first and second non-contact three-dimensional gesture sensors to detect a portion, but only a portion, of the current three-dimensional gesture.

13. The method of claim 8 wherein employing both the first and second non-contact three-dimensional gesture sensors to detect a three-dimensional gesture comprises, at least in part, determining which of the first and second non-contact three-dimensional gesture sensors is best suited to detect at least certain portions of a predicted three-dimensional gesture.

14. The method of claim 13 wherein determining which of the first and second non-contact three-dimensional gesture sensors is best suited is determined as a function, at least in part, of both sensing accuracy and power consumption.

15. A non-transitory digital memory having computer instructions stored therein, the computer instructions, when executed by a processor in an apparatus, serving to cause the processor to employ an application executed by the processor using one or more gestures as inputs;

a touch-sensitive display for sensing two-dimensional gestures in a two-dimensional plane;

a first non-contact three-dimensional gesture sensor for sensing a user's hand movement in front of and relative to the touch-sensitive display and second non-contact three-dimensional gesture sensor for sensing the user's hand movement in front of and relative to the touch-sensitive display, and based upon presets in the application, the first non-contact three-dimensional gesture sensor to detect a first portion of a three-dimensional gesture and second non-contact three-dimensional gesture sensor to detect a second portion of the three-dimensional gesture, the first and second non-contact three-dimensional gesture sensors employing differing gesture-sensing modalities; and switch between the first non-contact three-dimensional gesture sensor and the at least a second non-contact three-dimensional gesture sensor while in the process of detecting a current three-dimensional gesture of the user's hand movement, wherein the switch is based on each of
remaining predictable portions of the currently detected three-dimensional gesture, and
a combination of sensing accuracy, power consumption and computational intensity.

16. The non-transitory digital memory of claim 15 wherein employing both the first and second non-contact three-dimensional gesture sensors to detect a three-dimensional gesture comprises, at least in part, testing each of the first and second non-contact three-dimensional gesture sensors with respect to a current three-dimensional gesture to identify a best non-contact three-dimensional gesture sensor to employ to detect the current three-dimensional gesture.

17. The non-transitory digital memory of claim 15 wherein employing both the first and second three-dimensional non-contact gesture sensors to detect a three-dimensional gesture comprises, at least in part, using each of the first and second non-contact three-dimensional gesture sensors to detect a portion of a current three-dimensional gesture.

18. The non-transitory digital memory of claim 17 wherein using each of the first and second non-contact three-dimensional gesture sensors to detect a portion of a current three-dimensional gesture comprises, at least in part, using at least one of the first and second non-contact three-dimensional gesture sensors to detect a portion, but only a portion, of the current three-dimensional gesture.

19. The non-transitory digital memory of claim 15 wherein employing both the first and second non-contact three-dimensional gesture sensors to detect a three-dimensional gesture comprises, at least in part, determining which of the first and second non-contact three-dimensional gesture sensors is best suited to detect at least certain portions of a predicted three-dimensional gesture.

20. The non-transitory digital memory of claim 19 wherein determining which of the first and second non-contact three-dimensional gesture sensors is best suited is determined as a function, at least in part, of both sensing accuracy and power consumption.

\* \* \* \* \*